United States Patent [19]

Cook

[11] Patent Number: 4,531,192
[45] Date of Patent: Jul. 23, 1985

[54] APPARATUS AND METHOD FOR SENSING A WORKPIECE WITH AN ELECTRICAL ARC

[75] Inventor: George E. Cook, Nashville, Tenn.

[73] Assignee: CRC Welding Systems, Inc., Nashville, Tenn.

[21] Appl. No.: 422,369

[22] Filed: Sep. 23, 1982

[51] Int. Cl.³ .................. G06F 15/46; B23K 9/12; G05B 19/42

[52] U.S. Cl. .................... 364/513; 364/477; 219/124.01; 219/124.22; 901/10; 901/42; 901/46

[58] Field of Search ............... 364/474–477, 364/513, 148, 151–153, 180; 318/575–576; 219/124.1, 124.21, 124.22, 124.34, 125.1, 125.11, 125.12, 130.01; 901/2, 9–10, 41–42, 46

[56] References Cited

U.S. PATENT DOCUMENTS

| | | | |
|---|---|---|---|
| 3,646,309 | 2/1972 | Smith, Jr. et al. | 219/125 PL |
| 3,775,581 | 11/1973 | Sciaky | 219/121 EM |
| 3,777,115 | 12/1973 | Kazlauskas et al. | 219/125 R |
| 3,851,137 | 11/1974 | Verhagen et al. | 219/131 F |
| 3,904,846 | 9/1975 | Risberg | 219/135 |
| 4,019,016 | 4/1977 | Friedman et al. | 219/125 R |
| 4,095,077 | 6/1978 | Schneider et al. | 219/61 |
| 4,151,395 | 4/1979 | Kushner et al. | 219/125.12 |
| 4,158,124 | 6/1979 | Connell | 219/125.12 |
| 4,188,525 | 2/1980 | Merrick et al. | 219/125.12 |
| 4,199,674 | 4/1980 | Keser et al. | 219/124.34 |
| 4,249,062 | 2/1981 | Hozumi et al. | 219/124.34 |
| 4,258,425 | 3/1981 | Ramsey et al. | 364/513 |
| 4,302,655 | 11/1981 | Edling | 219/130.32 |
| 4,302,656 | 11/1981 | Poth et al. | 219/137 PS |
| 4,316,075 | 2/1982 | Isoya et al. | 219/124.22 |
| 4,336,440 | 6/1982 | Cook et al. | 219/124.34 |
| 4,392,604 | 7/1983 | Sears | 219/124.34 X |
| 4,394,559 | 7/1983 | Nomura et al. | 219/125.12 |
| 4,404,455 | 9/1983 | Gotoh | 219/124.34 |
| 4,409,650 | 10/1983 | Noguchi | 219/124.34 X |
| 4,456,808 | 6/1984 | Wilkinson et al. | 364/477 X |

FOREIGN PATENT DOCUMENTS 1517481  7/1978  United Kingdom .

Primary Examiner—Jerry Smith
Assistant Examiner—Gary V. Harkcom
Attorney, Agent, or Firm—Jones & Askew

[57] ABSTRACT

Apparatus and method for sensing the topography of a workpiece with an electrical arc by measuring a parameter of the electrical arc signal as an electrode is scanned across the surface of the workpiece by a tool manipulator such as a multi-axis robot arm, and processing the measured arc signal in order to derive the three-dimensional topography. The apparatus includes a digital microcomputer which samples the arc signal, stores a plurality of samples in computer memory, computes the average of a predetermined number of samples, and provides correction factors to the host computer of the robot manipulator so that the electrode or a tool carried by the robot can be adaptively positioned. The apparatus senses such features of the workpiece as holes, edges, and slopes of a given magnitude, and passes the location of these features to the host computer for appropriate corrective action. The system provides vertical correction factors as well as workpiece scanning correction factors so that the host can adaptively adjust the position of the electrode or of a separate tool with respect to the workpiece.

49 Claims, 11 Drawing Figures

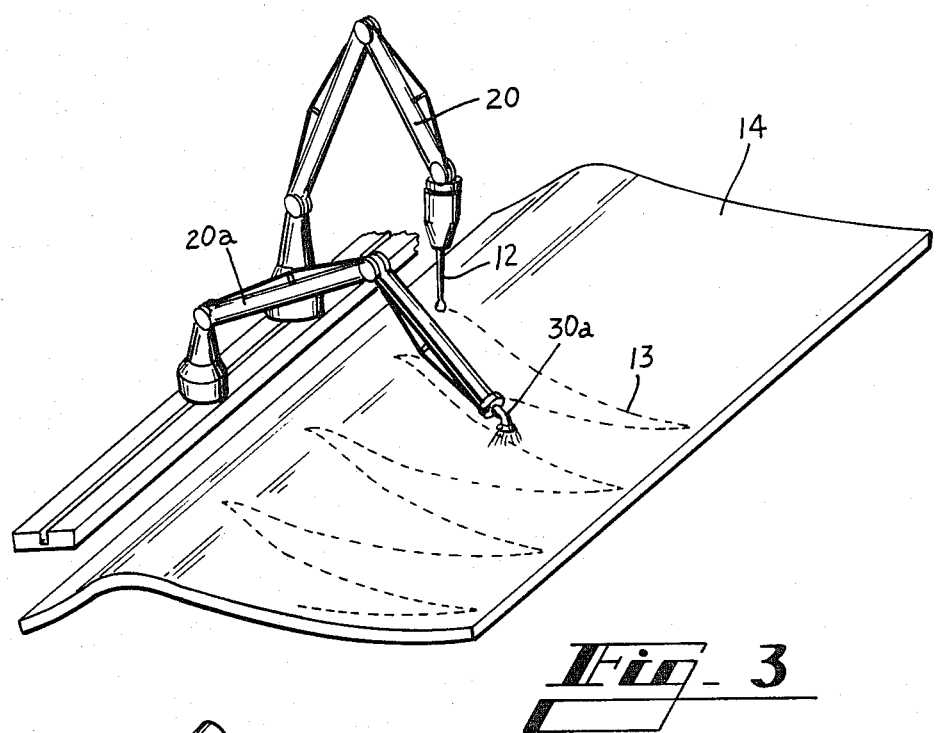
Fig_3
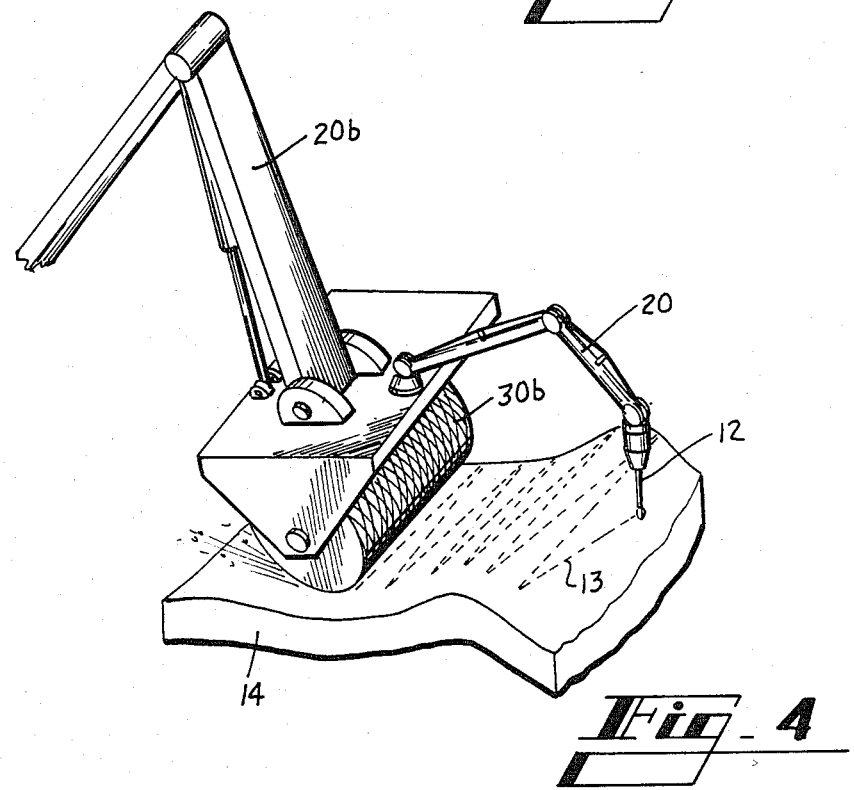
Fig_4

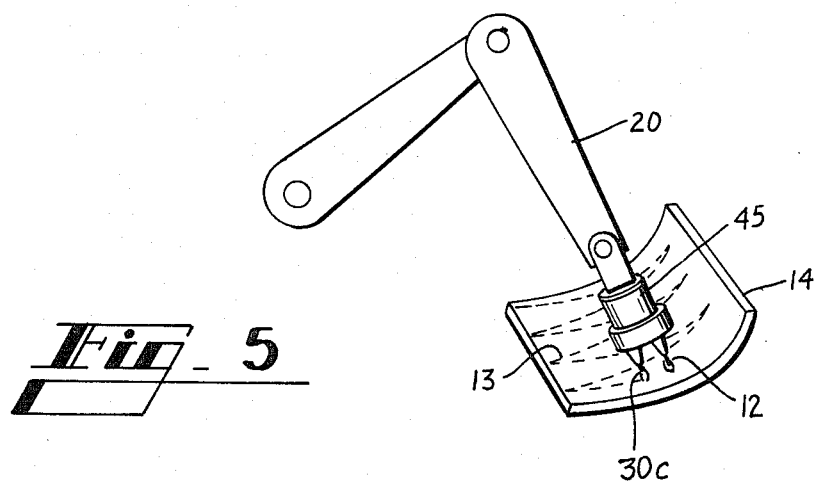
Fig_5
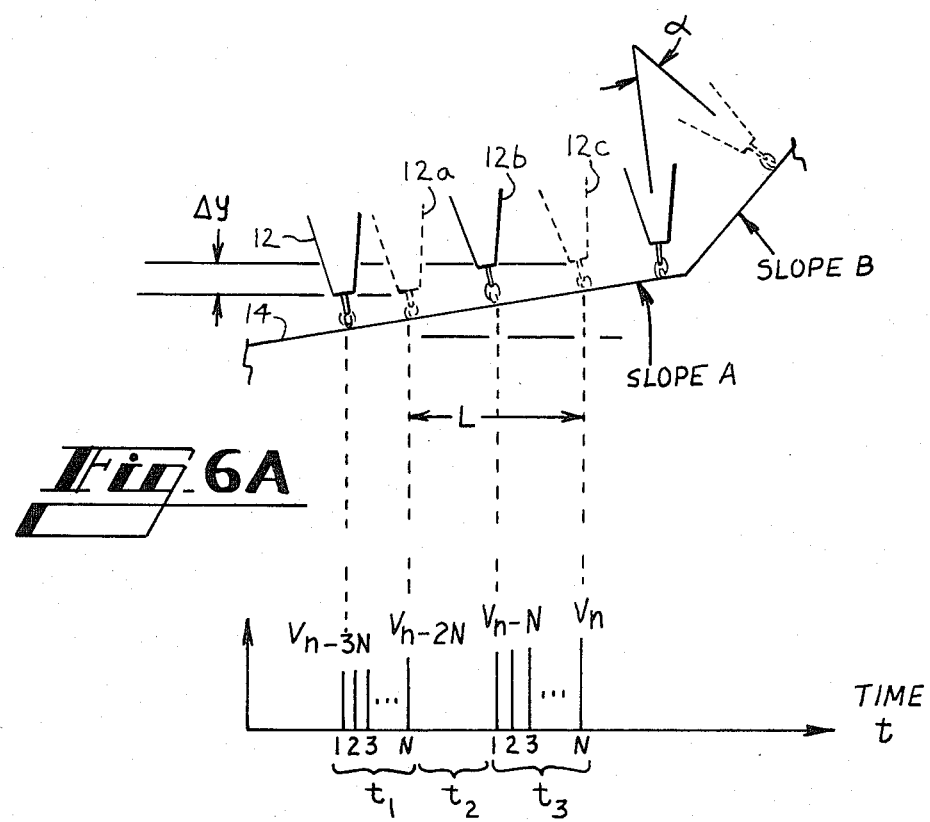
Fig_6A
Fig_6B

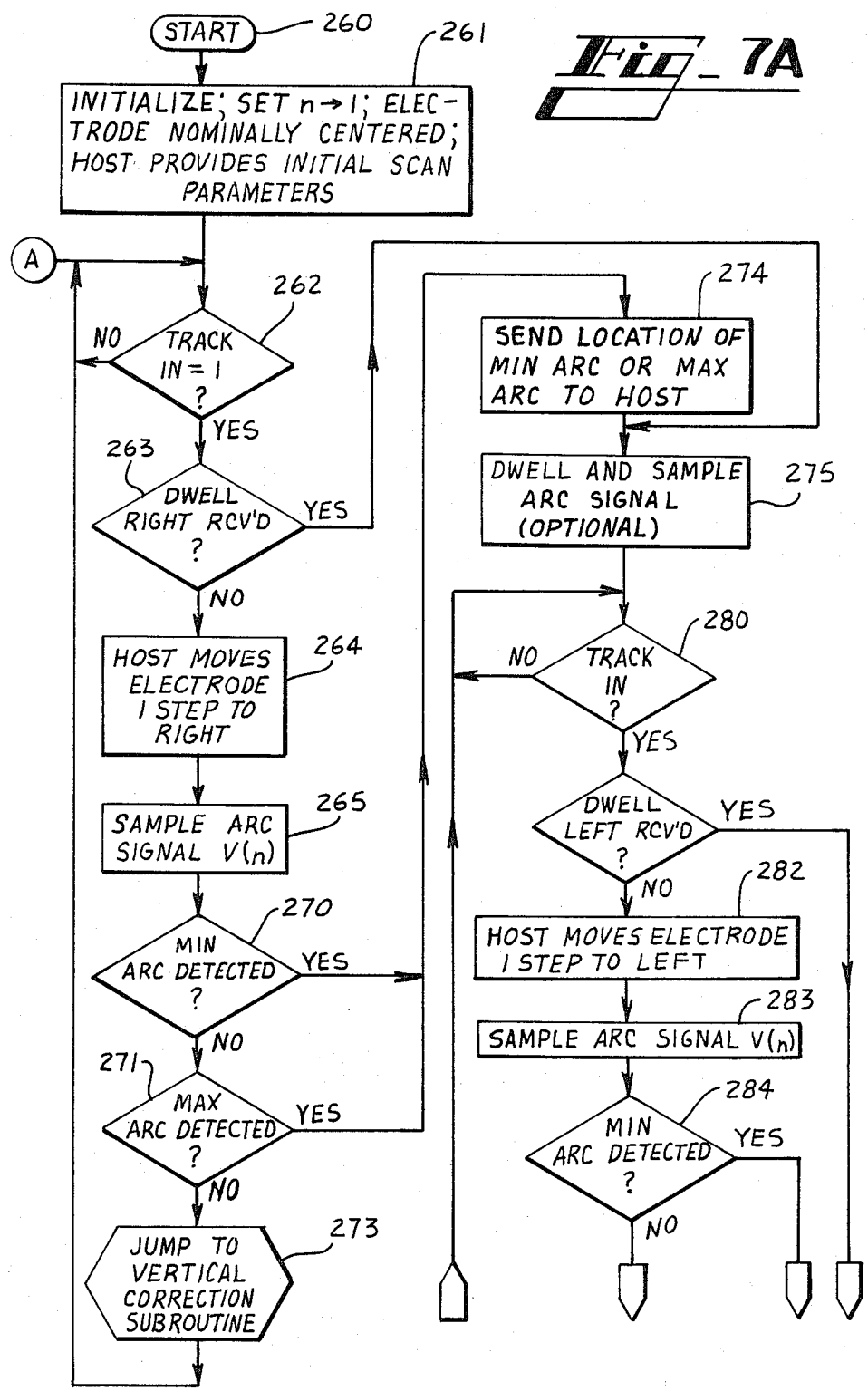

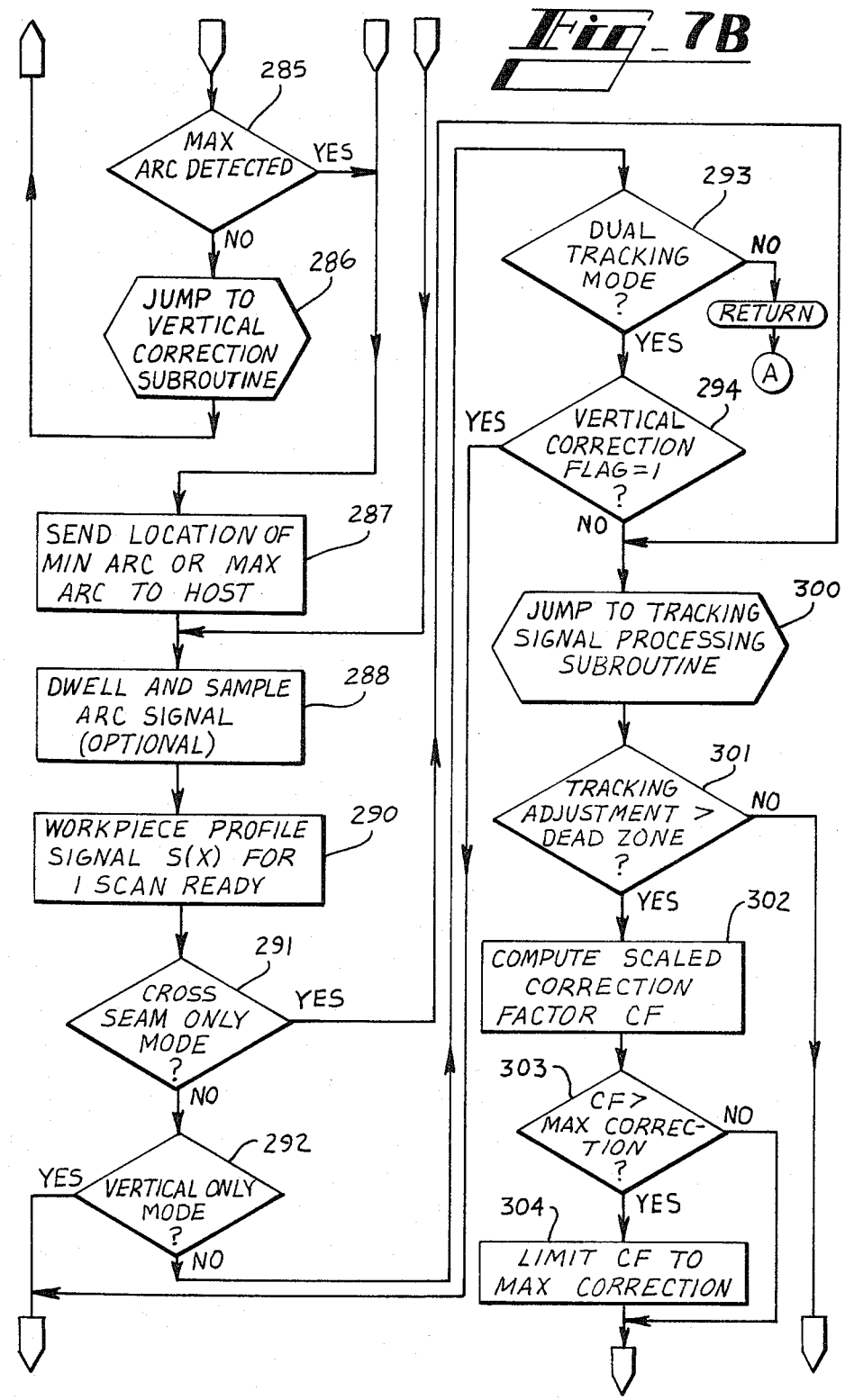

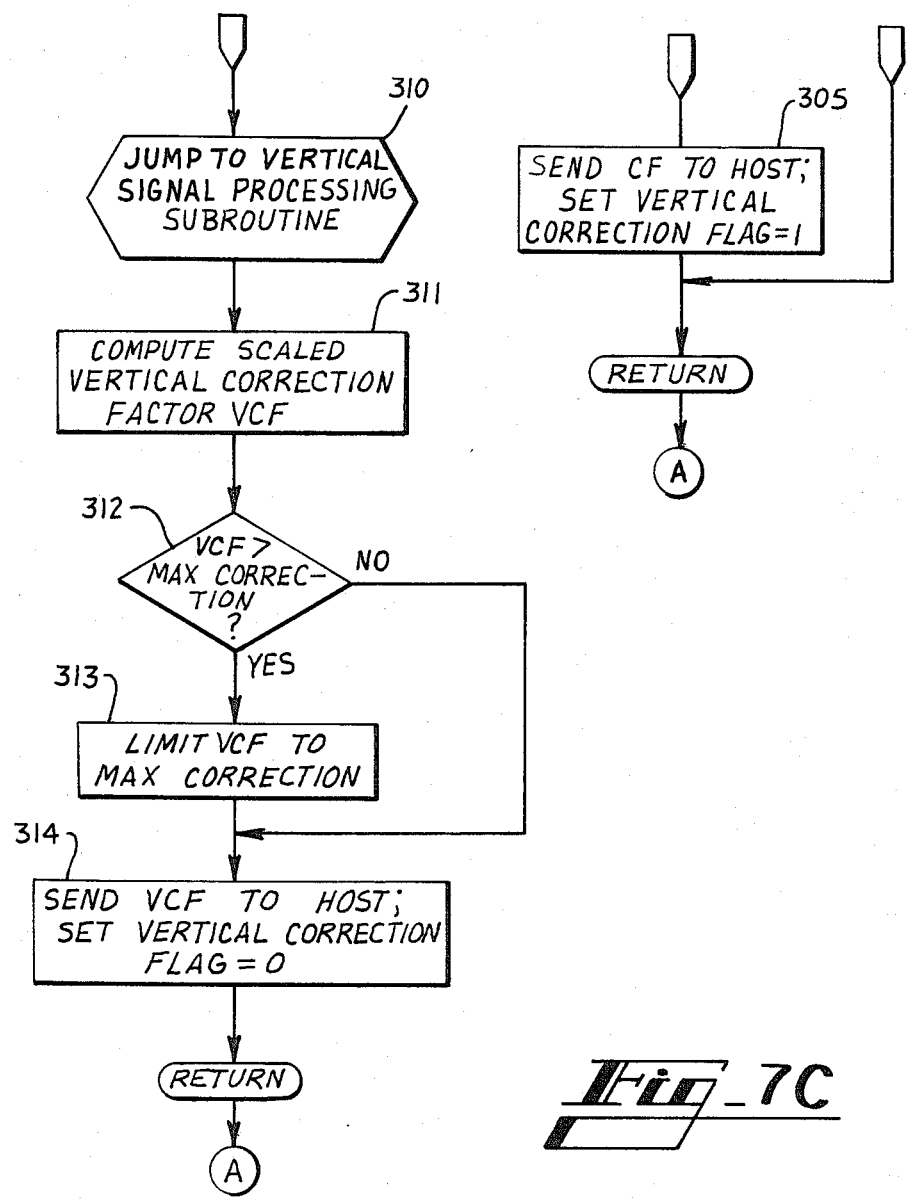
Fig_7C

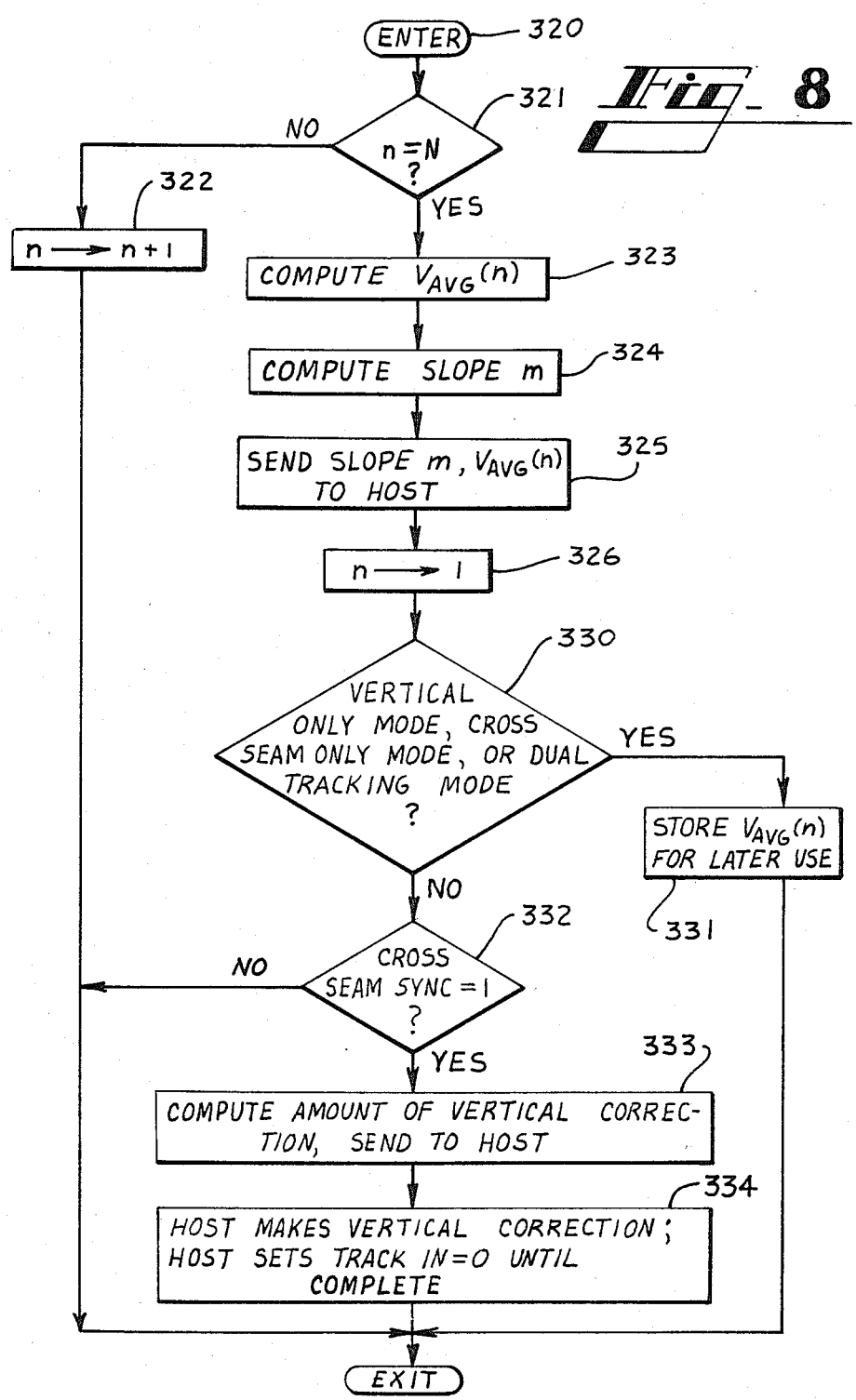

APPARATUS AND METHOD FOR SENSING A WORKPIECE WITH AN ELECTRICAL ARC

BACKGROUND

1. Field of the Invention

The present invention relates generally to automatic workpiece sensing, and relates specifically to apparatus and methods for sensing a workpiece with an electrical arc in order to adaptively position a tool in relation to the workpiece. The disclosed embodiment of the present invention is particularly adapted for use with tool manipulators such as multi-axis robots by obtaining information related to the topography of the workpiece so that the tool manipulator may adaptively position the tool as a function of the sensed topography of the workpiece.

2. Description of the Prior Art

Increased needs for automation in industry have resulted in the application of multi-axis manipulators, commonly called "robots", which move tools into proximity with a workpiece and perform a task. Tasks frequently performed include loading and unloading machinery, grinding, milling, spray painting, gluing, heat treating, assembling, welding, and the like.

The Robot Institute of America defines a "robot" as a "reprogrammable multifunctional manipulator designed to move material, parts, tools, or specialized devices through variable programmed motions for the performance of a variety of tasks." Robots are most widely classified according to whether they are controlled by nonservomechanisms or servomechanism drives. In nonservomechanism drives, the robot's tool center stops only at fixed-end points of motion. Although many sequential motions are possible along each axis, such motions can be accomplished only between two specific end points; there is therefore no motion control between points, and acceleration and deceleration of the arm is not possible. Simple pick-up-and-place robots fall within this class.

On the other hand, servomechanism-controlled robots have continuous-path arm motions and can be programmed to stop at any point within the arm's range of motion. Acceleration and deceleration of the arms is also possible. These robots, however, require sensors to gather feedback information concerning the velocity, position, acceleration, force and torque status of the manipulator. The servomechanism system compares the information obtained from the sensor with predetermined operational parameters in the control program. When deviations from the predetermined parameters are detected, the robot's servomechanism initiates corrective action.

Present research in sensor technology is directed in such diverse areas as vision-sensing systems (which includes such techniques as television-like array cameras as well as scanning fiber-optic vision systems and laser reflecting systems), tactile sensors, and sound-reflecting or sonar sensing systems. Sensing systems may be broadly classified in two categories: contacting sensors and noncontacting sensors. Contacting sensors include tactile, force array, and other devices which actually touch the workpiece being sensed. Noncontacting sensors include vision, eddy current, laser, acoustic and welding arc sensors.

A principal application of sensors to the movement of tool manipulators is to allow the manipulator, during operation, to adapt to prevailing and detected conditions rather than the ideal conditions originally programmed. Paths of travel, position of programmed points of movement, speed control, and timing are variables which appropriate sensors will allow to be adaptively controlled. For example, a scanning function would allow the topography of the workpiece to be mapped in three dimensions so that the features of the workpiece such as corners, holes, curvature, and the like can be located. Adaptive speed control enables the robot to select feed rates for hard surfacing, deburring, grinding, and similar operations. Contour tracking features enable the robot to follow a path which is not clearly defined and which deviates from the programmed path, as when the workpiece is defective or out of tolerance. Adaptive time and speed control furthermore assist the optimization of cycle times. Appropriate sensors coupled with multi-axis manipulators thus allow the creation of a computer map of the workpiece, recognition of the workpiece, planning or programming of actions to carry out an assigned task, recover from mistakes or anomalies encountered in the workpiece, and recognize when the assigned task is completed.

Although much emphasis is presently being given to vision sensing sensors, techniques for implementing vision sensing depend havily upon research in disciplines such as computer science, artificial intelligence, pattern recognition, and the like. Present vision oriented or electro-optical systems require extensive computing power in order to effectively and efficiently function. As a consequence, most present vision oriented systems, which frequently involve the use of complex signal processing algorithms, are either extremely simplistic or slow, or are very sophisticated and costly, as well as difficult to maintain reliably.

Prior to the present invention, it had been thought that techniques for magnetic and mechanical arc deflection for use in connection with arc sensors in nonwelding applications suffered from similar disadvantages. For example, it was once thought that arc sensors required distinct features of the workpiece such as sidewalls to be present for the sensor to differentiate between areas of the workpiece. It has now been discovered that an electrical arc may be successfully employed to sense the topography of a workpiece without the requirement that predefined sharp features such as a sidewall be present.

SUMMARY OF THE INVENTION

The present invention provides a method and apparatus for sensing the topography of a workpiece with an electrical arc. The preferred embodiment of the present invention is particularly adapted for use in connection with multi-axis tool manipulators by providing the sensed topography of the workpiece to the tool manipulator host so that the tool may be adaptively positioned in relation to the workpiece.

Briefly described, the apparatus of the present invention comprises an electrode which generates an electrical arc between the electrode and an electrically conductive surface of the workpiece, circuitry for measuring a parameter of the electrical arc and for providing an arc signal having a magnitude related to the vertical distance between the electrode and the surface of the workpiece, and signal processing circuitry which processes the arc signal and provides an output signal related to the sensed topography of the workpiece. Communication means are further provided for transmitting the output signal to an external destination such as the host computer of a multi-axis manipulator.

The electrode of the disclosed apparatus may be mounted on the same manipulator that carries the tool, or alternately may be mounted on a separate manipulator which scans the workpiece prior to engagement of the workpiece by the tool manipulator. In both approaches, the electrode is scanned about the surface of the workpiece, and the signals obtained from the electrical arc between the electrode and workpiece are processed to obtain feedback signals related to the topography of the workpiece for adaptive control.

A typical application of the apparatus of the present invention involves oscillating the electrode about a nominal centerline in a lateral direction as the electrode is moved by the manipulator in a longitudinal direction along the centerline. As certain features of the workpiece are detected, such as the presence of an edge, a hole, or a slope of the workpiece exceeding a predetermined slope, etc., the locations of these features are passed to the host computer. The host computer may then respond to the presence of these features by changing the direction of oscillation of the electrode or of the tool, or may initiate appropriate sequences to compensate for the feature, for example, by rotating an axis to maintain the sensing electrode or the tool perpendicular to the surface of the workpiece.

Briefly described, the method of the present invention includes generating an electrical arc between the electrode and the electrically conductive surface of the workpiece, moving the electrode along a path on the surface of the workpiece defined by projecting a line from the end of the electrode to intersect with a point on the surface, measuring a parameter of the arc which has a magnitude related to the vertical distance between the electrode and the surface of the workpiece (such as the arc voltage or current signal), storing in computer memory a plurality of samples of the sensed arc parameter signal which correspond to a predetermined portion of the path of movement of the electrode, calculating the average of the arc parameter signal over the predetermined portion of the path, providing the calculated average of the arc signal to the host computer, and adjusting the position of the tool or of the electrode or of both in relation to the workpiece in response to the calculated average of the arc parameter signal. The direction of movement of the sensing electrode is changed whenever the sensed arc signal or the average of the arc signal over the predetermined portion of the path exceeds a predetermined maximum value or is less than a predetermined minimum value, in order to prevent collision of the electrode with the workpiece.

The preferred embodiment also computes the slope of the workpiece for use by the host computer as a decision criteria for reversing motion or taking compensatory action. The slope of the workpiece is obtained by the steps of calculating the average of the arc signal over a first predetermined portion of the path of the electrode in order to obtain a first average value, calculating the average of the arc signal over a second predetermined portion of the path in order to obtain a second average value, and then dividing the difference between the first average value and the second average value by the horizontal distance traveled by the electrode between the first and second predetermined portions of the path. Once the slope of the workpiece is obtained, the angular position of the tool or of the electrode with respect to the workpiece may be adjusted by the tool manipulator. Additionally, the direction of movement of the electrode or of the tool along the path may be changed whenever the slope exceeds a predetermined maximum slope.

A variety of modes of operation are disclosed for the preferred embodiment. The tool may be moved along a predetermined path along the surface of the workpiece either in synchronization with the movement of the electrode as it scans the workpiece, or alternatively the tool and the electrode may be moved along a path in an asynchronous fashion. In the synchronous mode, the electrode sensor and the tool may be physically mounted to the same manipulator, or may be mounted to separate manipulators which move in synchronization. For asynchronous operation, the sensing electrode would typically be mounted to a separate manipulator so that the workpiece may be mapped topographically. The tool manipulator may then position the tool as a function of the workpiece map at a different time and with different sequences of movement from the scanning movement of the electrode when it sensed the workpiece.

Although the disclosed embodiment of the present invention was primarily designed for use in connection with nondestructive, nonwelding electrical arcs, the concepts and techniques taught herein are also useful in connection with adaptive control of electrical arc welding. A "nondestructive" electrical arc as used herein is an arc created when the voltage is sufficient to cause arcing between the electrode and the workpiece but having insufficient current to physically damage or melt down any portion of the workpiece.

Accordingly, it is an object of the present invention to provide an improved noncontacting sensor for multi-axis tool manipulators.

It is another object of the present invention to provide a method and apparatus for sensing the topography of a workpiece with an electrical arc.

It is another object of the present invention to provide a method and apparatus employing an electrical arc as a sensor which allows sensing of such features of a workpiece as edges, holes, and slopes of the workpiece so that a tool may be adaptively positioned in relation to the workpiece.

It is another object of the present invention to provide a method and apparatus for sensing the topography of a workpiece with an electrical arc which successfully isolates information concerning the topography of a workpiece from an electrical arc, which is typically electrically noisy and disruptive to electronic circuitry.

It is another object of the present invention to provide a method for obtaining topographical information from an electrical arc for use in connection with the adaptive positioning of a tool by a multi-axis tool manipulator.

These and other objects, features and advantages of the present invention may be more clearly understood and appreciated from a review of the following detailed description of the disclosed embodiment and by reference to the appended drawings and claims.

BRIEF DESCRIPTION OF THE DRAWINGS

FIG. 3 is a pictorial illustration of the sensing electrode mounted on a manipulator separate from the tool manipulator for asynchronous operation.

FIG. 4 is a pictorial illustration of a separate, smaller electrode sensor manipulator mounted to a larger tool manipulator.

FIG. 5 is a pictorial illustration of the sensing electrode and the tool as mounted to a single manipulator for synchronous movement.

FIGS. 6A and 6B illustrate the disclosed method for sampling the arc signal and for providing for continuous vertical adaptive positioning of the sensing electrode.

FIGS. 7A, 7B and 7C are flow chart diagrams of the general operation of the preferred embodiment.

FIG. 8 is a flow diagram of the vertical correction subroutine employed in the preferred embodiment.

DETAILED DESCRIPTION OF THE PREFERRED EMBODIMENT

Figure 1:
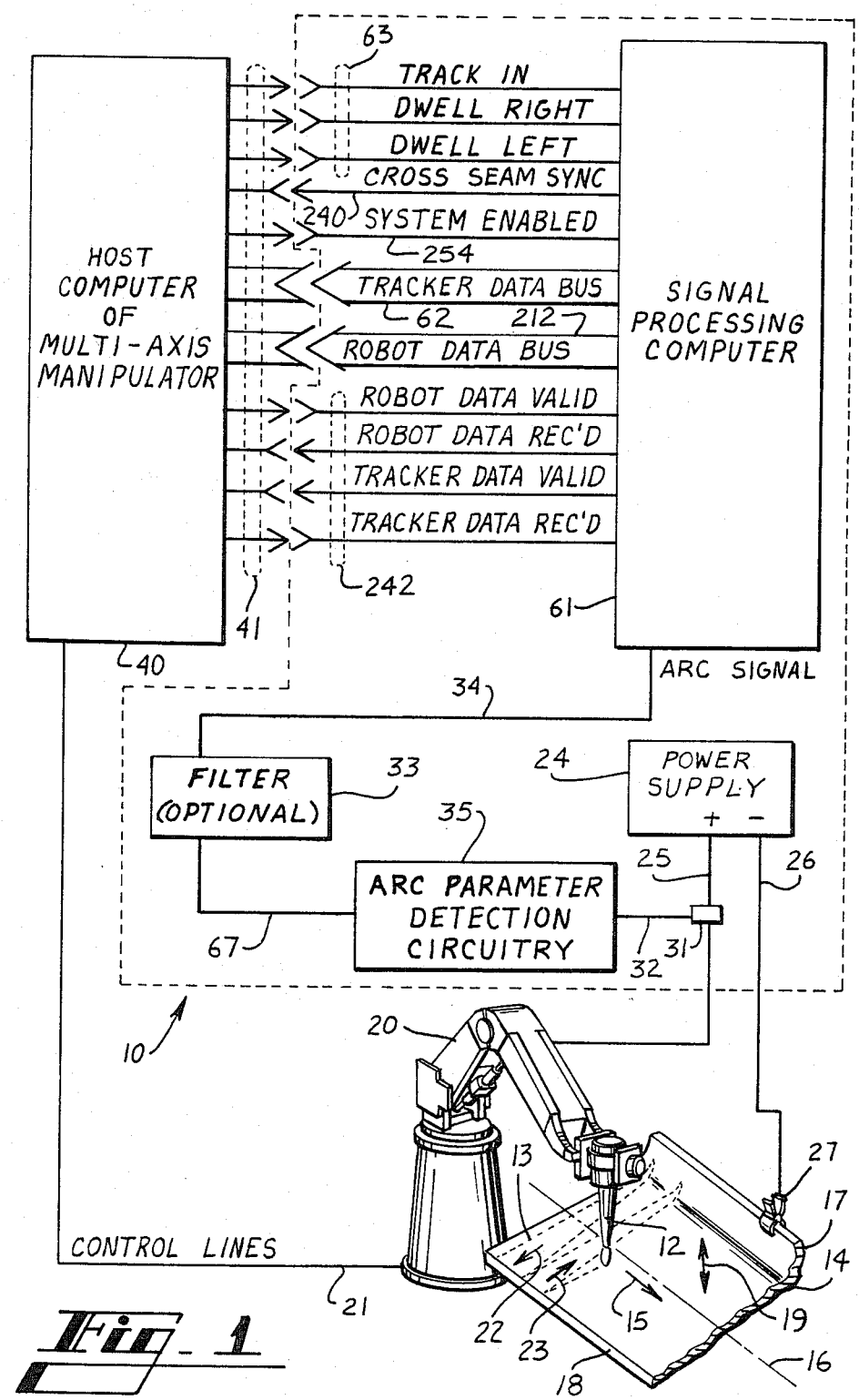
FIG. 1 is a schematic block diagram of the preferred embodiment of the present invention.

Referring now to the drawings, in which like numerals indicate like elements throughout the several views, FIG. 1 shows a schematic block diagram of the preferred embodiment of the apparatus 10 constructed in accordance with the present invention as connected to a system including the host computer 40 of a multi-axis manipulator 20. The multi-axis manipulator 20 or robot receives control outputs along control lines 21 from the host computer 40. The robot 20 carries a sensing electrode 12 which is supported by the robot a predetermined distance above an electrically conductive surface of a workpiece 14 and is scanned across the surface.

Information relating to the vertical spacing of the electrode 12 above the surface is derived from an electrical arc generated between the electrode and the surface. The arc is generated by a power supply 24 which is connected at its positive terminal on line 25 to electrode 12; the ground connection of power supply 24 is provided on line 26 to a connector 27 which is attached to the workpiece 14 to complete the circuit. The surface of the workpiece, if not a current-conductive metal, can be rendered electrically conductive by application of a conductive coating, such as metallized oil or paint, prior to use.

The power supply 24 for generating the electrical arc comprises a conventional direct current relatively high voltage low current power supply such as the type PWM-6 manufactured by Linde Division, Union Carbide Corporation, which has a current range from 0.1 to 15 amperes, adjusted to a level that sustains a stable arc while maintaining a nondestructive character. For example, an arc current of 3 amperes on a steel workpiece of ⅛ inch thickness or greater will be nondestructive. Use of such a power supply will insure that the electrical arc generated will be nondestructive in most applications.

It will be understood that the power source is not limited to direct current power supplies, and may comprise high frequency alternating current, or direct current, power supplies at substantially higher voltages and substantially lower currents. In applications related to welding, wherein the portion of the workpiece to be sensed comprises a weld seam, such as in the application Ser. Nos. 397,006 and 380,222, a conventional welding power supply may be employed and the arc parameter is measured as disclosed therein.

Signals from the electrical arc generated between the electrode 12 and the workpiece 14 are detected an arc current/voltage detector 31 and are provided along line 32 to arc parameter detection circuitry 35. The arc current/voltage detector 31 in the preferred embodiment comprises a Hall-effect sensor well known to those skilled in the art. The arc parameter detection circuitry 35 comprises in a preferred embodiment a conventional gain-adjustable operational amplifier well known to those skilled in the art, which is configured so as to allow adjustment of the gain received from the detector 31. The output from the arc parameter circuitry is provided on line 67 to an optional low-pass filter 33. If employed, the cutoff frequency of the low-pass filter should be sufficiently high to insure that the response time of the filter is not so slow as to impair the scanning oscillation frequency of the electrode. A cutoff frequency in the range of 25 hertz should be satisfactory.

The output of the filter 33, if employed, is provided on line 34 as the ARC SIGNAL which is sampled and processed by a signal processing computer 61. The ARC SIGNAL has a magnitude which varies proportionally to the electrode-to-workpiece spacing, except that transient noise signals which are difficult to remove by analog filter means may still be present. The signal processing computer 61, as discussed below, removes the undesirable noise components which are endemic to an electrical arc. The signal processing computer 61 processes the ARC SIGNAL received on line 34 and also performs the necessary computations in order that adaptive positioning information may be provided in a feedback manner to the host computer 40.

In the preferred embodiment, the signal processing computer 61 comprises the circuitry disclosed in now allowed application Ser. No. 380,222 entitled "Template-Matching Adaptive Control System for Welding" and application Ser. No. 397,006 entitled "Sidewall-Matching Adaptive Control System for Welding", now U.S. Pat. No. 4,477,713, the disclosures of which are incorporated by reference herein and made a part hereof. The elements identified in the aforementioned patent applications for signal processing computer 61 are the same as required for signal processing computer 61 of the present present invention, with only minor modifications which are described below in connection with FIG. 2. The lines 41 provide the communications between the host computer 40 and the signal processing computer 61.

The disclosed embodiment is operable with a variety of multi-axis tool manipulators. In particular, the disclosed embodiment is adapted for operation with the six-axis T3-726 manipulator arm manufactured by Cincinnati-Milacron of South Lebanon, Ohio. Other multi-axis manipulators, such as the six-axis Puma manufactured by Unimation, Inc. of Danbury, Conn.; the Series 1000 and 2000 manufactured by Westinghouse Electric Company of Pittsburgh, Pa.; and the six-axis Model AA160 manipulator manufactured by Bendix Corporation's Robotics Division in South Field, Mich., may easily be configured for operation with the present invention. It will therefore be appreciated that the robot 20 shown in FIG. 1 is representative of a variety of different robots which may be employed.

The host computer 40 which controls the movement of the robot 20 communicates with the apparatus 10 of the present invention along lines 41. The communication between the apparatus 10 and the host computer 40 includes the transmission of the topographical information from the signal processing computer 61 as well as the transmission of commands and operating parameters to the signal processing computer from the host.

The disclosed embodiment derives electrode position relative to the workpiece from the electrical arc itself by digitally processing the arc current or voltage signal. Depending upon the mode of operation selected, vertical and cross-seam correction values are periodically transmitted to the host computer 40, allowing the electrode to be adaptively positioned in response to unexpected changes in the topography of the workpiece. The topographical information may then be used to guide the same or another robot along the workpiece as it manipulates a tool. For purposes of the present application and for the above-referenced copending applications, "cross-seam" correction means the correction of the location of the nominal centerline of oscillation of the electrode 12 as it "scans" or traverses the workpiece 14.

Assuming for purposes of discussion of FIG. 1 that the robot 20 carries only the electrode 12 for purposes of sensing the workpiece, it is necessary that the electrode be moved along the surface of the workpiece to obtain sufficiently resolved information pertaining to the topography of the workpiece. The movement of the electrode sensor along a path on the surface of the electrode is referred to as "scanning" the workpiece. Typically, scans of the workpiece require placement of the electrode into proximity with the workpiece, generation of the electrical arc, and then movement of the electrode along a path which is more or less predefined. A path of travel of the electrode may be defined on the surface of the workpiece 14 by projecting a line from the end of the electrode 12 to intersect perpendicular with the surface of the workpiece 14, as the electrode is moved.

It is also convenient to consider the movement of the electrode during the scan as an oscillation between extremes about a nominal centerline of oscillation. In FIG. 1, the nominal centerline of oscillation is shown at 16. If the oscillation of the electrode about the centerline 16 is begun at point 15, the scan may be defined as movement of the electrode in a first direction, indicated by the arrow 22, until an extreme of oscillation is reached, as for example when the edge 18 of the workpiece is encountered, followed by movement of the electrode in a second direction, indicated by arrow 23, which crosses the centerline 16 and reaches a second extreme of movement, such as the sloped wall 17 of the workpiece. The movement of the electrode 12 in the direction of arrows 22, 23 may be described as lateral, while the movement along the centerline 16 in the direction of arrow 15 is described as movement in the longitudinal direction. Movement of the electrode in the direction of arrows 19 towards and away from the plane of the workpiece 14 is vertical movement.

As will be described in greater detail below, a typical scan involves moving the electrode in the first direction until either (1) a signal is received from the host that a predetermined extreme of movement has been reached or (2) a feature of the workpiece such as an edge or an excessively steep slope has been encountered, thereby requiring either cessation of movement in the first direction to prevent damage to the electrode or movement of the electrode away from the workpiece to continue the scan. Examples of predetermined extremes of movement include the physical limits of reach of the robot as well as decision criteria such as the detection of a particular feature or of an excessive steep slope of the workpiece which might require impossible accelerations or decelerations or combinations of axis movements.

Figure 2:
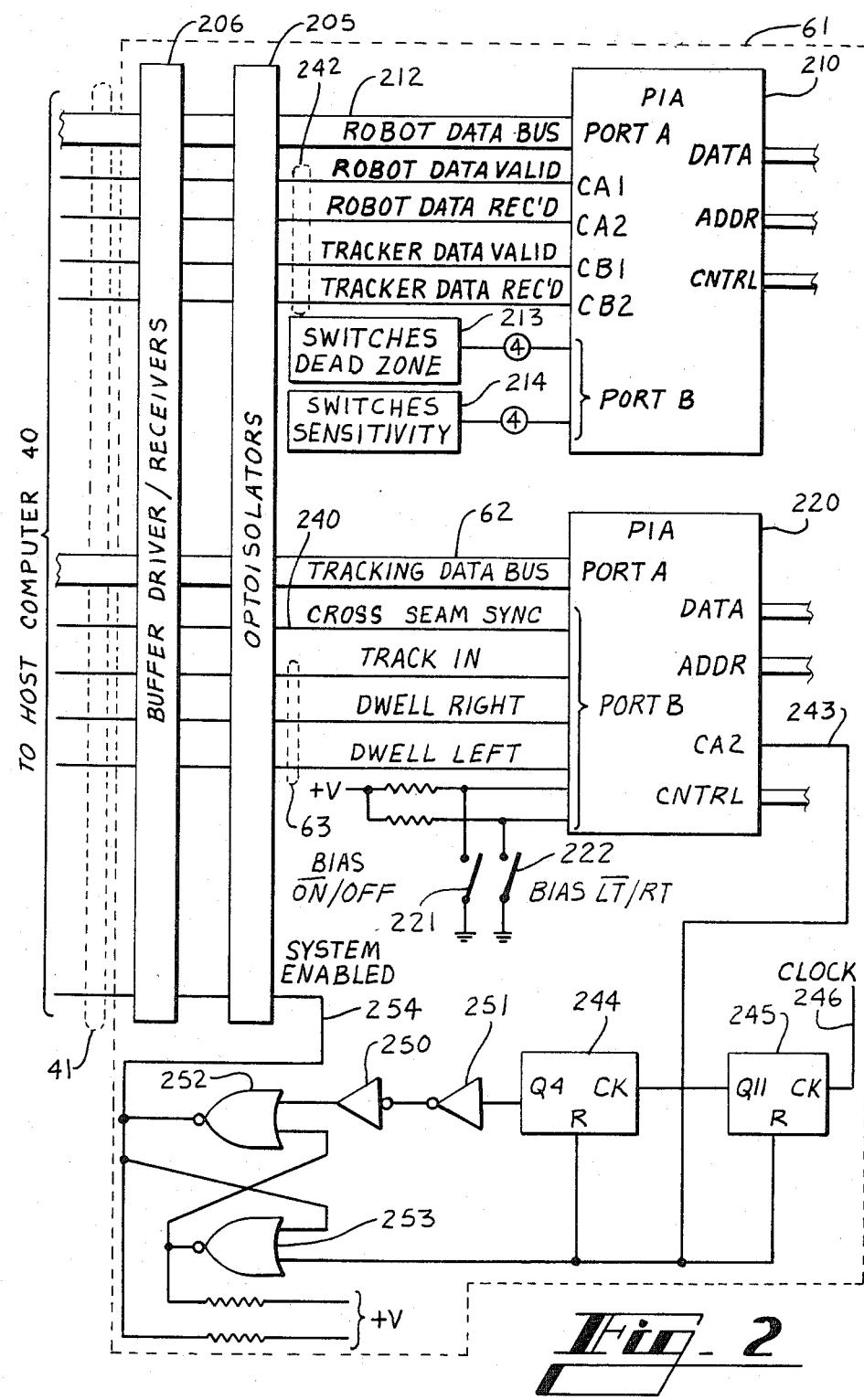
FIG. 2 is a partial schematic diagram of the interface between the host computer and the signal processing computer in the preferred embodiment.

In FIG. 2 is illustrated the interface circuitry for the signals communicated between signal processing computer 61 and the host computer 40. It should be understood that the circuitry for signal processing computer 61 is predominantly disclosed in above-referenced applications and that the signals and connections shown in FIG. 2 adapt the signal processing computer 61 disclosed therein to be used in the manner described herein for purposes of the present invention.

All signals between the host computer 40 and signal processing computer 61 are carried on lines 41. These signals are electrically isolated by conventional optoisolators 205, which in the preferred embodiment are type HP2602 line receiver optocouplers manufactured by Hewlett-Packard, of Palo Alto, Calif. All outputs from the signal processing computer are provided through an optoisolator 205 to a buffer/line driver 206, in the preferred embodiment a type 7406 open collector inverter, which drives the line in the conventional manner. All inputs received from the host computer are first provided to a similar type 7406 inverter 206 prior to optoisolator 205.

Eight of the lines 41 are provided as ROBOT DATA BUS 212, which is connected to PORT A of peripheral interface adapter (PIA) 210. This data bus is used to transmit two distinct types of data to the signal processing computer: (1) modes of operation, and (2) reference parameters. A predetermined eight-bit code indicates whether the cross-seam only tracking mode, the vertical only tracking mode, or the dual tracking mode has been selected. These modes of operation are discussed below. A different predetermined eight-bit code indicates that the next data transmitted over the ROBOT DATA BUS comprises a vertical distance reference value. The vertical distance reference transmitted is an eight-bit number which represents the average arc current or voltage which is to be maintained by vertical corrections.

In actuality, five modes of operation are possible. In the preferred embodiment, the three modes of operation identified in the preceding paragraph are directly selected by command from the host computer. The remaining two modes of operation, continuous vertical correction and single-scan dual tracking, are implemented by signals other than those transmitted over ROBOT DATA BUS 212. The cross-seam only tracking mode is a mode of operation in which lateral correction values for the centerline of oscillation of the electrode are transmitted after each left dwell period. In the vertical only tracking mode, a vertical correction value will be transmitted to the host computer after each left dwell period. In the dual tracking mode, both the cross-seam and vertical modes of operation are in effect; correction values for each mode are transmitted to the host computer on alternate cycles after each left dwell period. In the single-scan dual tracking mode, the vertical and cross-seam modes are multiplexed within a single scan of the electrode. Vertical correction values are transmitted to the host computer during a predetermined portion of the lateral movement of the electrode across the workpiece; cross-seam tracking correction values are transmitted during the remainder of the lateral motion of the electrode towards the extremes of oscillation. The signal CROSS SEAM SYNC provided by the host computer on line 240 informs the signal processing computer 61 when it is appropriate to transmit cross seam or vertical correction values in the single-scan dual tracking mode. The continuous vertical correction mode is operational by default when none of the other modes have been selected.

Lines 242 are handshaking lines which allow the host computer 40 and the single processing computer 61 to determine when valid information appears on either the ROBOT DATA BUS 212 or the TRACKING DATA BUS 62. The signal ROBOT DATA VALID is provided from the host computer when information is available to be read on the ROBOT DATA BUS 212. When the data has been taken by the signal processing computer 61, the computer transmits the signal ROBOT DATA REC'D to acknowledge the receipt of the information. In a similar fashion, when the signal processing computer 61 is ready to transmit information on the TRACKING DATA BUS 62, the signal TRACKER DATA VALID is provided; the host computer 40 acknowledges receipt of the information by returning the signal TRACKER DATA REC'D. Lines 242 are connected to control inputs CA1, CA2, CB1, and CB2 of PIA 210. Those skilled in the art will understand that control lines CA1, CA2, CB1, and CB2 are bidirectional control lines of the PIA which operate either as an interrupt input line or as a peripheral control output line, as determined by a control register contained in the PIA.

TRACKING DATA BUS 62 is provided from optoisolators 205 to the PORT A of PIA 220. The signal CROSS SEAM SYNC is provided on line 240 from optoisolators 205 to one of the lines of PORT B of PIA 220. Similarly, lines 63 carry the input signals TRACK IN, DWELL RIGHT and DWELL LEFT to other lines of PORT B of PIA 220. The function of these signals is provided in the referenced copending applications. Switches 221, 222 allow biasing of the electrode to one side or the other of the centerline of oscillation, as disclosed in the copending applications. Similarly, switches 213, 214 are connected to PORT B of PIA 210 for selecting the dead zone and sensitivity, as disclosed in the above-referenced applications.

One of the control outputs CA2 of PIA 220 is provided on line 243 to the reset input (R) of counters 244, 245. In the preferred embodiment, counters 244, 245 are type CD4040 CMOS 12-stage, ripple-carry binary counter/dividers manufactured by RCA Corporation. The system clock of signal processing computer 61 is provided on line 246 to the clock (CK) input of counter 245. The Q11 output of counter 245 is connected to the clock (CK) input of counter 244. The Q4 output of counter 244 is provided through inverters 250, 251 to the input of a NOR gate 252, which together with NOR gate 253 is configured as a conventional cross-coupled latch.

The control output on line 243 from PIA 220 is also provided to an input of NOR gate 253. The output of NOR gate 252 is provided on line 254 as the signal SYSTEM ENABLED which is transmitted through an optoisolator 205 to the host computer. Any internal error condition detected by signal processing computer 61 during its operation which might cause the tracking to malfunction causes a high signal to appear on line 243, resetting counters 244, 245 and forcing the SYSTEM ENABLED signal high. The host computer responds to this situation by aborting the tracking or by taking other appropriate action.

FIGS. 3-5 illustrate a variety of techniques for mounting the electrode 12 on robot manipulator arms for scanning the workpiece. In FIG. 3, the sensing electrode 12 is mounted on a first manipulator arm 20, while a separate manipulator 20a carries a tool 30a. The electrode 12 is shown scanning the workpiece 14 by tracing the path 13 along the surface of the workpiece. The tool 30a in this illustration follows the same path 13 as traced by the electrode 12 except in an asynchronous fashion. As the information is obtained by the scanning electrode 12, it is provided to the host computer which then guides the tool 30a along the surface of the workpiece 14 to perform its task delayed by a predetermined amount in order to insure that the operation of the tool does not interfere with the electrode. For example, if the tool 30a is a spray painter, a time delay on the order of several seconds might be desirable in order to insure that paint does not spray the electrode.

FIG. 4 shows a small manipulator arm 20 which is mounted to a larger manipulator 20b in a piggyback fashion. The tool 30b in this illustration is a large cylindrical grinder which is guided along the surface of the workpiece 14 by manipulator 20b. It may be seen that the grinder 30b covers a relatively large work area when compared to the area scanned by the electrode 12; it is thus infeasible to move the grinder in the same path as that traced by the electrode 12. Consequently, the electrode 12 is mounted for relatively independent movement via manipulator 20 so that it may scan the workpiece 14 ahead of the grinder in order to obtain the workpiece topography. The tool 30b is adaptively positioned with respect to the workpiece by manipulator 20b so that the scanning electrode 12 is able to scan the workpiece directly in front of the path of the grinder.

FIG. 5 illustrates synchronous movement of the scanning electrode 12 and a tool 30c. In this illustration, the robot manipulator 20 carries both the electrode 12 and the tool 30c in a rigid assembly along the same path 13. It will be appreciated that due to the physical separation of the electrode and the tool, the features of the workpiece 14 sensed by the electrode will not fall beneath the work area of the tool until the manipulator has moved the entire tool-and-electrode assembly further along the path. Consequently, the host computer must compensate for the physical separation by incorporating a delay or offset into the motion of the tool since the tool follows in the path of the electrode. The host furthermore might be configured so that the tool does not cover the entire area of the workpiece scanned by the electrode, depending upon the application. For example, the manipulator 20 in FIG. 5 includes a pivotable wrist axis 45 which allows the host to initiate a sequence which pivots the tool-and-electrode assembly when the electrode encounters the edge, thereby bringing the tool up to the edge and preparing for a return motion across the body of the workpiece.

In applications wherein the tool and the sensing electrode are the same, such as welding applications wherein information pertaining to the topography of the workpiece is obtained directly from the welding arc, considerations of synchronization of the movement of the electrode and the tool do not apply. In such applications, the apparatus appears as shown in FIG. 1. Similarly, in applications wherein a map of the workpiece is to be obtained without having the host computer perform a task with a tool upon the workpiece, the apparatus shown in FIG. 1 wherein the manipulator carries only a sensing electrode 12 is sufficient to perform the mapping task.

FIGS. 6A and 6B illustrate the method of the mode wherein vertical correction of the electrode is continuously provided. Referring first to FIG. 6A, the workpiece 14 is shown having a first section having a first slope A and a second section having a slope B. The electrode 12 is shown oriented perpendicularly to the workpiece 14 along the slope A. As the electrode 12 is moved laterally to the position indicated in dotted relief at 12a, the arc signal detected by the signal processing computer will indicate a lessening vertical distance. In the preferred embodiment, the arc signal of sensing arc is sampled at a rate of five thousand samples per second for twenty milliseconds, and then twenty milliseconds is allowed for vertical correction to take place. The vertical correction is made in response to the averaged samples taken during the twenty millisecond sampling period. Consequently, as shown in FIG. 6B, during the twenty-millisecond period t1 the arc signal V(n) is sampled N times, where N is five thousand. N samples of the arc signal V(n) are taken during $t_1$ and stored in computer memory. These N samples are then averaged according to EQUATION 1:

$$V_{AVG}(n) = \frac{1}{N} \sum_{i=1}^{N} V(n - i)$$

The computed average signal $V_{AVG}(n)$ is then compared to the vertical distance reference which had been earlier provided by the host computer. A correction value is computed based on the difference between the vertical distance reference and $V_{AVG}(n)$ and transmitted over the TRACKING DATA BUS 62 to the host computer. It will be appreciated that the host may respond to the average signal by initiating action, for example, by changing the direction of movement of the electrode if the average signal exceeds a predetermined value indicative of a too-close approach to the workpiece.

The host can also respond to the average signal by changing the vertical spacing of the electrode above the workpiece. Still referring to FIG. 6A, the host computer adjusts the vertical position of the electrode to that shown at 12b by an amount Δy. During the period allowed for the vertical correction, shown in FIG. 6B as t2, the lateral movement of the electrode might be continued so that the actual movement of the electrode is from position 12a to position 12b. Alternatively, the host computer might use period t2 to make vertical adjustments to the position of the electrode without continuing the movement of the electrode laterally along the path, so that positions 12a and 12b laterally coincide.

During the period t3, in a fashion similar to that described above, as the electrode is moved from the position shown at 12b to that shown at 12c, N additional samples are made, and further adjustments of the vertical position of the electrode are made.

Once at least two values for $V_{AVG}(n)$ have been computed, it is possible to compute the slope of the workpiece. This is conducted as follows. In FIG. 6B, assume that at the end of time t3 there have been taken a total of n samples of the arc signal. Since there have been at least two calculations of $V_{AVG}(n)$, one group of N samples taken during time t3 include the samples $V_{n-N}$ to $V_n$. The samples taken during the time $t_1$ include the samples $V_{n-3N}$ to $V_{n-2N}$. A first average of the arc signal is as represented as Equation 1 above, and a second average of the arc signal $V_{AVG}(n-2N)$ is represented by the following EQUATION 2:

$$V_{AVG}(n - 2N) = \frac{1}{N} \sum_{i=1}^{N} V(n - 2N - i)$$

Finally, assuming that the lateral distance traveled by the electrode in moving from 12a to 12c is L, the slope m of the workpiece is computed by the following EQUATION 3:

$$\text{Slope } m = \frac{V_{AVG}(n) - V_{AVG}(n - 2N)}{L}$$

Once the slope m of the workpiece ir known, it is transmitted to the host computer for use by the host. For example, if the slope exceeds a predetermined value, the host may reverse the direction of lateral movement of the sensing electrode or of the tool when the slope is reached. This slope detection is particularly convenient for detecting a sidewall of a workpiece.

Alternatively, the host might use the slope information to adjust the angular position of the electrode with respect to the workpiece. For example, as shown in FIG. 6A, if the electrode is initially perpendicular such as shown at 12 on slope A, and a new slope B is detected, an angular adjustment α may be made to the position of the electrode so as to maintain the electrode substantially perpendicular to the workpiece. In this fashion, it is possible using the present invention to scan the electrode over extremely complex geometries and to provide a computer map of these geometries. When such tasks are contemplated, it is important to maintain the electrode substantially perpendicular to the workpiece in order to insure that erroneous readings are not taken which are due to arcing from the side of the sensing electrode because the electrode is positioned at a sharp angle relative to the workpiece.

Operation

FIGS. 7A, 7B and 7C are a general flow chart diagram of the method whereby the objects of the present invention may be accomplished with the disclosed apparatus. Those skilled in the art will understand how to program signal processing computer 61 to accomplish the steps disclosed. It will be understood by those skilled in the art that the flow chart represents a possible series of steps which may be taken to accomplish the objectives of the present invention, and that other sequences of steps may be employed with success in accomplishing the positioning of the sensing electrode. Furthermore, it will be understood that the diagram shown in FIGS. 7A, 7B and in FIG. 8 may be implemented by means of hard-wired logic circuits in place of microprocessors while still successfully accomplishing the objectives of the invention.

Starting at 260 in FIG. 7A, the signal processing computer 61 performs an initializing routine at 261, well known to those skilled in the art, which resets the system and initializes switches and registers within the computer. A counter for keeping track of the number of data samples is set so that n equals 1, the electrode is nominally centered at a starting point in proximity to the workpiece, and the host provides initial scan parameters such as the vertical distance reference.

The TRACK IN signal received on one of the lines 63 from the host computer is a command to the signal processing computer to begin the scanning operation. If TRACK IN equals a one at 262, the inquiry is made at 263 whether the signal DWELL RIGHT has also been received from the host. The host is assumed at this point to have begun the movement of the scanning electrode along the path laterally to scan and longitudinally along the centerline. The DWELL RIGHT signal will be provided by the host when the host has determined based on the information previously supplied, that further movement of the electrode in the rightward direction is not desirable. For example, if the robot has reached the extent of its range of movement, or has been previously supplied with information by the signal processing computer that the electrode is approaching a previously-detected feature of the workpiece such as a hole, a steep wall, or an edge, or if it is appropriate for the sensing electrode to dwell, as when the sensing electrode and the tool are a welding electrode, then the signal DWELL RIGHT will be provided by the host and detected at 263. In the event that this signal is received, the program flow goes to block 275, about which more will be said later.

If the DWELL RIGHT signal has not been received, at 264 the host will continue the movement of the electrode in the righward direction. At 265, a sample of the ARC SIGNAL V(n) is taken and stored in computer memory.

At decision blocks 270 and 271, the sampled signal V(n) is compared to predetermined minimum and maximum acceptable levels. This comparison is essentially a "safety limit" determination made to insure that the vertical distance to the workpiece is not so short as to threaten the integrity of the electrode or so great as to suggest that the electrode has moved so far from the workpiece as to extinguish the arc. The minimum acceptable arc or "min arc" inquiry at 270 is manifested as a maximum current value or a minimum voltage value, depending upon the particular parameter sensed. The maximum acceptable arc or "max arc" inquiry at 271 is similarly preprogrammed. If either the min arc or max arc have been detected, the program flow goes to 274, and the location of the min arc or max arc is relayed to the host for appropriate action.

In the event that the safety limits are not impinged, the program reaches block 273 wherein a subroutine entitled "vertical correction" is called and executed. This subroutine is discussed in greater detail in connection with FIG. 8 below. Upon exit from the subroutine, the program flow returns to decision block 262 and awaits confirmation from the host that it is appropriate to continue sampling and tracking.

When either the DWELL RIGHT signal has been received from the host, or a min arc or max arc have been detected, the program flow reaches block 275. If appropriate, the electrode dwells at the extreme of oscillation and additional samples of the arc signal are taken. The incorporated referenced patent applications contain a discussion of welding applications wherein it is sometimes desirable to obtain additional samples at the extremes of oscillation as the electrode dwells. Additionally, a dwell time may be required in some applications or sequences or movement to insure the mechanical settling of the robot arm.

After the dwell time is complete and the host is prepared to move the electrode in the leftward and opposite direction, the program flow reaches decision block 280 wherein the signal processing computer 61 awaits the signal TRACK IN from the host. Movement of electrode begins and the signal processing computer checks for receipt of the DWELL LEFT signal at 281. The steps performed at blocks 282–288 for the movement of the electrode to the left are exactly the same as discussed in connection with blocks 264–275, and such functions as the detection of the min arc or max arc, the execution of the vertical correction subroutine, and the like are performed. When the program flow has reached block 290, there is now in computer memory data pertaining to one complete lateral scan or oscillation of the electrode across the surface of the workpiece. A workpiece profile signal S(X) which represents the topography of the workpiece for the scan just completed is now stored in computer memory and may be transmitted to the host if applications requiring creation of a computer map are required.

It will be appreciated, however, that the workpiece profile signal S(x) comprises the information relating to vertical correction values which are transmitted to the host during the execution of the vertical correction subroutine. Since the host is constantly tracking the lateral and longitudinal positions of the electrode, and since vertical corrections are transmitted to the host after the average of N samples, the host may easily associate the vertical correction data with the lateral and longitudinal position to form a three-dimensional topographical map. Should the application require the transmission of the profile signal S(x) on any other basis, those skilled in the art will understand that the data needed will be readily available in memory.

After completion of transmission of the workpiece profile signal S(x), if required, the program flow reaches decision block 291 in FIG. 7B, where the inquiry is made whether the cross seam only mode has been selected by command from the host. If so, the program flow reaches block 300 and a subroutine entitled "tracking signal processing" is called and executed. This signal processing subroutine is executed in applications wherein tracking of the sensing electrode or of a tool such as a welding electrode is performed by template matching or sidewall matching as disclosed in the incorporated referenced patent applications. Reference is made to these copending applications for discussion of methods and flow diagrams for adaptive tracking by template matching or sidewall matching. In particular, if the robot is performing welding operations, use of the techniques described in the copending applications will provide advantageous.

Upon exit from the tracking signal processing subroutine, there will be made available by the signal processing computer a lateral adjustment to the location of the centerline of oscillation of the electrode. At block 301, if the computed tracking adjustment exceeds a predetermined "dead zone" value, a scaled correction factor (CF) is computed at 302. The amount of dead zone is preprogrammed via switches 213 shown in FIG. 2. Those skilled in the art will understand that the scaling of the correction factor may be required to proportionally adjust to the actual amount of lateral correction required.

At 303, if the scaled correction factor CF exceeds a predetermined maximum allowable correction, CF is limited to the maximum allowable correction. For example, if the host computer is arranged to maintain the scan within certain predefined limits of movement of the manipulator, only a predetermined amount of correction may be allowable. This predetermined maximum allowable amount may be transmitted by the host computer to the signal processing computer as an initial scan parameter at block 261.

The final lateral correction factor, preferably an eight bit, two's complement number provided on the TRACKING DATA BUS 62, is transmitted to the host computer, which may then provide appropriate commands to the robot arm so that awkward positions of the arm may be avoided or so that the arm is extended to properly support the tool to track and engage the workpiece. At 305, the correction factor is transmitted to the host and the vertical correction flag is set to a one. The vertical correction flag is a record which is maintained for purposes of implementing the dual tracking mode wherein cross seam correction is made only on alternate scans of the electrode. After transmission of the correction factor to the host, the program flow returns to point A on FIG. 7A to block 262.

In the event that the cross seam only mode has not been selected at 291, an inquiry is made at 292 whether the vertical only mode has been selected. If so, the program flow reaches block 310 and a vertical signal processing subroutine similar to the tracking signal processing subroutine discussed above is called and executed. This subroutine is substantially as discussed in connection with FIG. 8 except that typically this subroutine will be employed wherein relatively narrow workpieces are sensed. In these applications, there may be no need for continuous vertical correction and vertical corrections may need only be made once per scan cycle.

Upon exit from the vertical signal processing subroutine 310, there will be available an amount of vertical correction for transmission to the host. At 312, the vertical correction factor VCF is compared to a maximum allowable correction, and if appropriate at 313 the VCF will be limited to the maximum allowable. This maximum allowable correction is another initial scan parameter provided by the host at step 261. At 314, the vertical correction factor VCF is transmitted to the host computer, and the vertical correction flag is set to zero for purposes of the dual tracking mode. Then, the program flow returns to point A in FIG. 7A, at decision block 262.

Assuming that neither the cross seam only or vertical only mode has been selected at 292, the inquiry is made at 293 whether the dual tracking mode has been selected. If not, the program flow returns to point A on FIG. 7A at decision block 262. Since none of the selectable operational modes have been selected by the host computer, continuous vertical correction will automatically take place unless, as will be described below, the signal CROSS SEAM SYNC is received, indicating the single-scan dual tracking mode.

If the dual tracking mode has been selected at 293, the inquiry is made at 294 whether the vertical correction flag equals a one. If yes, the program flow proceeds to blocks 310–314. If the vertical correction flag is a zero, then the steps indicated at blocks 300–305 are followed. It will now be appreciated that there has been described the steps of the method wherein the various modes of operation of the preferred embodiment may be selected and accomplished.

Referring now to FIG. 8, the vertical correction subroutine which is called at blocks 273 and 286 in FIG. 7A will be described. Entering the subroutine at 320, the first step is to inquire at 321 whether there have been taken N data samples. A register internal to the signal processing computer 61 maintains a count n of the number of data samples. As described above, a typical number N of data samples obtained in a twenty millisecond period is five thousand. If N samples have not been taken, the count n of the number of samples taken is increased by one at 322, and the subroutine exits. Thus, the program returns to point A on FIG. 7A, movement of the electrode is continued, and additional data samples are taken if the dwell signal has not been received from the host computer.

If the count n of data samples has reached N at 321, the average of the arc signal samples is computed at 323 according to EQUATION ONE above. At 324, the slope m of the workpiece is computed according to EQUATION THREE, assuming that at least two arc signal averages have been computed.

At 325, the computed slope m and arc signal average $V_{AVG}(n)$ are transmitted to the host computer. The count of the number of data samples is then reset to one at 326.

After these computations, at 330 the inquiry is made whether the vertical only, cross seam only, or dual tracking mode has been selected. If either of these modes has been selected, at 331 the value of $V_{AVG}(n)$ is stored in computer memory for later use by either the host in forming the computer map of the workpiece, or for use in the tracking signal processing subroutine or in the vertical signal processing subroutine. Then, the subroutine exits.

If none of the alternative modes have been selected at 330, the program flows from 330 to 332 where an inquiry is made whether the CROSS SEAM SYNC signal equals a logical one. If not, this is an indication that the single-scan dual tracking mode has been selected by the host and that the electrode is presently in the "cross seam" area wherein no vertical corrections are to be made to the position of the electrode; information attributable to the vertical movement of the electrode is thus decoupled from information pertaining to the topography of the workpiece. In other words, the electrode is not to be moved vertically so that the data samples taken of the arc signal will reflect only the topography of the workpiece without interference by vertical movement.

If the CROSS SEAM SYNC signal is a one at 332, at 333 the amount of vertical correction, appropriately scaled if required, is computed and transmitted to the host. This step 333 is reached if continuous vertical correction is in operation or if in the single-scan dual tracking mode the electrode is tracing the portions of the path between the extremes of movement and across the centerline.

At 334, the host responds to the vertical correction amount transmitted by the signal processing computer and initiates corrective action by moving the electrode vertically. The host computer sets the signal TRACK IN to a zero until the vertical movement is complete or until the host desires tracking and mapping data gathering to continue; the subroutine then exits and the flow returns to point A on FIG. 7A, wherein the signal processing computer waits for the host to make the TRACK IN signal a one.

It will now be appreciated and understood that there has been disclosed a method and apparatus for sensing the topography of a workpiece by scanning an electrical arc generated between an electrode and the workpiece across the surface of the workpiece, taking data samples of an electrical parameter related to the vertical distance between the electrode and the workpiece, and processing the data samples in order to obtain correction values for the vertical position of the electrode as well as information concerning the features of the workpiece.

The preferred embodiment of the present invention has been disclosed by way of example and it will be further understood that other modifications and alterations may occur to those skilled in the art without departing from the scope and spirit of the appended claims.

What is claimed is:

1. Apparatus for sensing with an electrical arc the topography of a workpiece having an electrically conductive surface and for providing data representative of the sensed topography to a control means operatively associated with a manipulator apparatus, comprising:
    means for continuously generating an electrical arc between an electrode and the electrically conductive surface of the workpiece;
    measuring means for measuring a parameter of said arc and for providing an arc signal having a magnitude related to the distance between said electrode and said surface of the workpiece;
    means responsive to said arc signal for detecting the spacing between said electrode and the surface of the workpiece and for providing a minimum arc signal when the electrode approaches within a predetermined minimum distance from the surface and a maximum arc signal when the electrode exceeds a predetermined maximum distance from the surface;
    means associated with said control means for causing said manipulator to move said electrode with respect to the workpiece surface and responsive to said minimum arc signal and said maximum arc signal for maintaining said electrode between said predetermined minimum distance and said predetermined maximum distance from the surface to maintain said electrical arc continuously as said electrode is moved; and
    signal processing means responsive to said arc signal for providing output data representative of the sensed continuous topography of the workpiece to said control means.

2. The apparatus of claim 1, further comprising communication means for transmitting said output data to said control means.

3. The apparatus of claim 2, wherein said manipulator apparatus comprises a robot manipulator.

4. The apparatus of claim 1, wherein said electrical arc is a nondestructive electrical arc.

5. The apparatus of claim 1, further comprising electrode scanning means associated with said control means for causing said manipulator apparatus to move said electrode along a path on the surface of the workpiece, said path being defined by projecting a line from the end of said electrode to intersect perpendicularly upon a point on said surface of the workpiece as said scanning means moves said electrode.

6. The apparatus of claim 5, wherein said electrode oscillates about a nominal centerline, and wherein said scanning means moves said electrode laterally across said surface of the workpiece in a first direction with respect to said centerline to a first extreme of oscillation, and then said scanning means moves said electrode laterally across said surface of the workpiece in a second direction with respect to said centerline to a second extreme of oscillation.

7. The apparatus of claim 6, wherein said first extreme and said second extreme each comprise a separate predetermined feature of the topography of the workpiece.

8. The apparatus of claim 7, wherein each of said predetermined features of the topography of the workpiece comprises an edge of the workpiece.

9. The apparatus of claim 7, wherein said predetermined feature of the topography of the workpiece comprises a portion of the workpiece which manifests a predetermined elevation above a predetermined limit elevation.

10. The apparatus of claim 5, wherein said scanning means moves said electrode between a predetermined first lateral limit in a first direction with respect to a nominal centerline of oscillation and a predetermined second lateral limit in a second direction with respect to said centerline of oscillation.

11. The apparatus of claim 10, wherein said output signal comprises a signal related to the location of said centerline of oscillation.

12. The apparatus of claim 11, wherein said scanning means is operative to scan a predetermined portion of said path and is thereafter responsive to provide said output data.

13. The apparatus of claim 5, wherein said scanning means moves said electrode between a predetermined first vertical limit in a first direction with respect to said surface of the workpiece and a predetermined second vertical limit in a second direction with respect to said surface of the workpiece.

14. The apparatus of claim 13, wherein said output data comprises a signal related to the location of said first vertical limit and said second vertical limit.

15. The apparatus of claim 5, further comprising memory means, and wherein said signal processing means is operative to store in said memory means a plurality of samples of said arc signal obtained during a predetermined portion of said path, and is thereafter operative to provide an average signal based on a computed average of said plurality of samples to said control means as said output data.

16. The apparatus of claim 15, wherein said scanning means is responsive to said average signal to change the direction of movement of said electrode along said path whenever said average signal exceeds a predetermined value.

17. The apparatus of claim 15, wherein said plurality of samples comprises a first plurality of samples and a second plurality of samples, and wherein said signal processing means is operative to provide a slope signal to said control means as said output data, said slope signal being based upon a first average signal based on said first plurality of samples and a second average signal based on said second plurality of samples.

18. The apparatus of claim 17, wherein said scanning means is responsive to change the direction of movement of said electrode along said path whenever said slope signal exceeds a predetermined value.

19. Apparatus for sensing with an electrical arc the topography of a workpiece having an electrically conductive surface and for providing data representative of the sensed topography to a control means operatively associated with a manipulator apparatus, comprising:
    an electrode;
    means for continuously generating a nondestructive electrical arc between said electrode and the electrically conductive surface of the workpiece;

scanning means associated with said control means for causing said manipulator to scan said electrode along a path of said surface of the workpiece, said path being defined by projecting a line from said electrode to intersect perpendicularly with a point on said surface, said scanning means operative to maintain said electrode within a predefined vertical limit above said surface;

arc parameter measuring means for measuring a parameter of said arc and for providing an arc signal related to the vertical distance between said electrode and said surface;

means responsive to said arc signal for detecting the spacing between said electrode and the surface of the workpiece an for providing a minimum arc signal when the electrode approaches within a pedetermined minimum distance from the surface and a maximum arc signal when the electrode exceeds a predetermined maximum distance from the surface;

means associated with said control means and responsive to said minimum arc signal and said maximum arc signal for maintaining said electrode between said predetermined minimum distance and said predetermined maximum distance from the surface to maintain said electrical arc continuously as said electrode is moved; and signal processing means responsive to said arc signal for providing output data representative of the sensed continuous topography of the workpiece to said control means.

20. Apparatus for sensing the topography of a workpiece with an electrical arc in order to adaptively position a tool in relation to the workpiece with a tool manipulator, comprising:

an electrode;

means for generating an electrical arc between said electrode and an electrically conductive surface of the workpiece;

scanning means for moving said electrode along a path on said surface defined by projecting a line from the end of said electrode to intersect perpendicularly with a point on said surface;

means for measuring a parameter of said arc and for providing an arc signal having a magnitude related to the vertical distance between said electrode and said surface;

memory means responsive to said arc signal for storing a plurality of samples of said arc signal corresponding to a predetermined portion of said path;

signal processing means for computing an average of a predetermined number of said plurality of samples of said arc signal stored in said memory means;

communication means for providing said average to a tool manipulator; and control means operatively associated with said tool manipulator and responsive to said average for adjusting the position of the tool in relation to said surface.

21. The apparatus of claim 20, further comprising means responsive to change the direction of movement of said electrode along said path whenever said average exceeds a predetermined maximum value.

22. The apparatus of claim 20, further comprising means responsive to change the direction of movement of said electrode along said path whenever said average is less than a predetermined minimum value.

23. The apparatus of claim 20, further comprising means responsive to change the direction of movement of said electrode along said path whenever said arc signal exceeds a predetermined value.

24. The apparatus of claim 20, further comprising means responsive to change the direction of movement of said electrode along said path whenever said arc signal is less than a predetermined value.

25. The apparatus of claim 20, wherein said signal processing means is responsive to compute a first average of said arc signal over a first predetermined portion of said path, a second average of said arc signal over a second predetermined portion of said path, and a slope signal corresponding to the slope of the workpiece by dividing the difference between said first average and said second average by the horizontal distance between said first predetermined portion and said second predetermined portion of said path.

26. The apparatus of claim 25, wherein said tool manipulator means is responsive to said slope signal to adjust the angular position of the tool with respect to the workpiece.

27. The apparatus of claim 25, further comprising means responsive to change the direction of movement of said electrode whenever said slope signal exceeds a predetermined value.

28. The apparatus of claim 25, wherein said scanning means is responsive to said slope signal to adjust the angular position of said electrode in relation to said surface.

29. A method for sensing the topography of a workpiece with an electrical arc in order to adaptively position a tool in relation to the workpiece with a tool manipulator, comprising the steps of:

generating an electrical arc between an electrode and an electrically conductive surface of the workpiece;

moving the electrode along a path on the surface of the workpiece defined by projecting a line from the end of the electrode to intersect perpendicularly with a point on the surface;

measuring a parameter of the arc and providing an arc signal having a magnitude related to the vertical distance between the electrode and the surface of the workpiece as the electrode is moved along the path;

storing in a memory a plurality of samples of the arc signal corresponding to a predetermined portion of the path of the electrode;

calculating the average of the plurality of samples of the arc signal stored in the memory;

providing the calculated average of the arc signal to a tool manipulator; and adjusting the position of the tool in relation to the workpiece with the tool manipulator in response to the calculated average of the arc signal.

30. The method of claim 29 including the step of changing the direction of movement of the electrode along the path whenever the calculated average of the arc signal exceeds a predetermined maximum value.

31. The method of claim 29 including the step of changing the direction of movement of the electrode along the path whenever the calculated average of the arc signal is less than predetermined minimum value.

32. The method of claim 29 including the step of changing the direction of movement of the electrode along the path whenever the arc signal exceeds a predetermined maximum value.

33. The method of claim 29 including the step of changing the direction of movement of the electrode along the path whenever the arc signal is less than a predetermined minimum value.

34. The method of claim 29 including the step of moving the tool along the path on the surface of the workpiece asynchronously with the movement of the electrode along the path.

35. The method of claim 29 wherein the work area of the tool covers a predetermined portion of the path of the electrode along the surface of the workpiece, and including the step of moving the tool along a second path on the surface of the workpiece so that the work area of the tool covers the predetermined portion of the path of the electrode.

36. The method of claim 29, including the step of adjusting the travel speed of the tool along the surface of the workpiece in response to the calculated average of the arc signal.

37. The method of claim 29, wherein the tool is a rotational tool such as a polisher or a grinder, and including the step of adjusting the rotational speed of the tool in response to the calculated average of the arc signal.

38. The method of claim 29, wherein the tool provides a hard surface to the surface of the workpiece, and further including the step of adjusting the amount of hard surface provided by the tool in response to the calculated average of the arc signal.

39. The method of claim 29, including the step of oscillating the electrode about a nominal centerline as the electrode is moved along the surface of the workpiece.

40. The method of claim 39, including the step of moving the tool along the nominal centerline of oscillation of the electrode so that the work area of the tool is maintained in a predetermined relation to the surface of the workpiece.

41. The method of claim 29 including the step of moving the tool along the path on the surface of the workpiece in synchronization with the movement of the electrode along the path.

42. The method of claim 41 wherein the tool and the electrode are moved along the path in synchronization by a manipulator.

43. The method of claim 41 wherein the electrode is moved along the path by a first manipulator, and the tool is moved along the path in synchronization with the electrode by a second manipulator.

44. The method of claim 29 including the steps of calculating the average of the arc signal over a first predetermined portion of the path of the electrode in order to obtain a first average;

calculating the average of the arc signal over a second predetermined portion of the path of the electrode in order to obtain a second average; and calculating the slope of the workpiece by dividing the difference between the first average and the second average by the horizontal distance traveled by the electrode between the first predetermined portion and the second predetermined portion of the path.

45. The method of claim 44, including the step of adjusting the angular position of the tool with respect to the workpiece in response to the calculated slope.

46. The method of claim 44 including the step of changing the direction of movement of the electrode along the path whenever the calculated slope of the workpiece exceeds a predetermined maximum slope.

47. The method of claim 44, including the step of adjusting the angular position of the electrode in relation to the surface of the workpiece in response to the calculated slope.

48. The method of claim 44, wherein the electrode is maintained substantially perpendicular with respect to the surface of the workpiece in response to the calculated slope.

49. The method of claim 44, wherein the tool is maintained substantially perpendicular with respect to the surface of the workpiece in response to the calculated slope.

* * * * *

UNITED STATES PATENT AND TRADEMARK OFFICE
CERTIFICATE OF CORRECTION

PATENT NO. : 4,531,192
DATED : Jul. 23, 1985
INVENTOR(S) : Cook

It is certified that error appears in the above-identified patent and that said Letters Patent is hereby corrected as shown below:

Column 2, line 25 "havily" should be --heavily--.

Column 13, line 62 "or movement" should be --of movement--.

Signed and Sealed this

Twenty-third Day of September 1986

[SEAL]

Attest:

DONALD J. QUIGG

Attesting Officer

Commissioner of Patents and Trademarks